United States Patent
Smith et al.

(10) Patent No.: US 7,715,718 B2
(45) Date of Patent: May 11, 2010

(54) PASSIVE OPTICAL NETWORK OPTICAL TIME-DOMAIN REFLECTOMETRY

(75) Inventors: Joseph Lee Smith, Fuquay Varina, NC (US); Alain Granger, Raleigh, NC (US)

(73) Assignee: Alcatel Lucent, Paris (FR)

( * ) Notice: Subject to any disclaimer, the term of this patent is extended or adjusted under 35 U.S.C. 154(b) by 767 days.

(21) Appl. No.: 11/461,522

(22) Filed: Aug. 1, 2006

(65) Prior Publication Data
US 2008/0031624 A1    Feb. 7, 2008

(51) Int. Cl.
*H04J 14/00* (2006.01)
(52) U.S. Cl. .............................. 398/72; 398/16; 398/17; 398/20; 398/21; 356/73.1
(58) Field of Classification Search ................... 398/33, 398/66, 67, 68, 69, 70, 71, 72, 16, 21, 17, 398/30, 31, 20; 356/73.1
See application file for complete search history.

(56) References Cited

U.S. PATENT DOCUMENTS

| | | |
|---|---|---|
| RE36,471 E | 12/1999 | Cohen |
| 6,396,575 B1 * | 5/2002 | Holland ........... 356/73.1 |
| 2006/0133806 A1 * | 6/2006 | Krimmel ............ 398/33 |
| 2006/0198634 A1 * | 9/2006 | Ofalt et al. .......... 398/16 |

\* cited by examiner

*Primary Examiner*—Hanh Phan
(74) *Attorney, Agent, or Firm*—Capitol Patent & Trademark Lawfirm, PLLC

(57) ABSTRACT

Optical Time-Domain Reflectometer (OTDR) troubleshooting of a passive optical network (PON) can be enhanced by deploying cascaded splitters, at least some of which have multiple inputs. That is, at least some of the splitters in the PON have not only a first input coupleable to the optical line terminator (OLT) or output of another splitter but also a second input directly coupleable to an Optical Time-Domain Reflectometer (OTDR). Optical time-delay reflectometry can be performed upon a selected portion or segment of the PON by selecting a splitter and transmitting an optical test signal from the OTDR directly to the input of the selected splitter and analyzing the reflected signal.

9 Claims, 3 Drawing Sheets

PASSIVE OPTICAL NETWORK OPTICAL TIME-DOMAIN REFLECTOMETRY

BACKGROUND OF THE INVENTION

1. Field of the Invention

The present invention relates generally to passive optical networks (PONs) and, more specifically, to troubleshooting a PON using an Optical Time-Domain Reflectometer (OTDR) or other optical instrument.

2. Description of the Related Art

Most digital telecommunications networks (i.e., networks that facilitate the communication of data, voice, video, etc., between parties or between a content distribution service and subscribers) typically comprise active components, such as repeaters, relays and other such devices that consume power, in the path between a central office (or exchange, as its sometimes referred to) and a subscriber. In addition to requiring power, active components are subject to failure and performance degradation over time, and may require significant periodic maintenance. The passive optical network (PON) has been developed to overcome some of these deficiencies. The essence of a PON is that nothing but optical fiber and passive components are found in the path between the central office and subscribers. A single fiber can run from the central office to a passive splitter located near a group of subscribers, such as a neighborhood or office complex, and individual fibers can run from the splitter to individual subscribers or sub-groups of subscribers. Splitters can be cascaded to reach a greater number of subscribers.

The International Telecommunications Union (ITU) and the Institute of Electrical and Electronics Engineers (IEEE) are two standards-making bodies currently developing PON standards. The ITU has adopted recommendations of the Full Service Access Networks (FSAN) organization, including G983.x, a specification sometimes referred to as "broadband PON" (BPON), and G984.x, a specification sometimes referred to as "gigabit PON" (GPON). The IEEE has also adopted IEEE 802.3-based PON standards referred to as "Ethernet PON" (EPON) and "gigabit EPON" (GEPON). These standards and recommendations are well-known to persons skilled in the art to which the invention relates and are therefore not described in further detail in this patent specification ("herein").

In accordance with these standards, a PON comprises an optical line termination (OLT), which is typically located at the central office, and a number of optical network termination (ONTs) (also known as optical network units), each located at the subscriber's premises (e.g., home, office building, etc.), with optical fiber and one or more splitters between the OLT and ONTs. In the downstream direction, i.e., data transmitted from the OLT (e.g., located at the central office) to an ONT (e.g., located at a subscriber's premises), the data units are broadcast from the OLT to all of the ONTs on the PON, and an ONT can select the data to receive by matching the address embedded in the data units to a previously provisioned or learned address. In other words, an ONT only "listens" to data units having a matching address. Thus, the OLT can transmit data to a particular or selected ONT by addressing it to that ONT. In the upstream direction, i.e., data transmitted from an ONT to the OLT, the data units are time-domain multiplexed.

An Optical Time-Domain Reflectometer (OTDR) is an instrument that is commonly used to analyze optical networks for troubleshooting or set-up purposes. An OTDR analyzes the light loss in an optical fiber by transmitting a (laser) light pulse into the optical fiber and measuring the backscatter and reflection of light as a function of time. The reflected light characteristics are analyzed to determine the location of any broken or damaged fibers, faulty connectors, splice losses, or other faults.

While an OTDR can successfully be used to troubleshoot many types of optical networks, signal losses from the passive splitters hamper its use in a typical PON of the type that provides video, voice, Internet service, etc., from a service provider to subscribers. As illustrated in FIG. 1, the conventional manner in which an OTDR 10 is used to troubleshoot a PON involves disconnecting the OLT 12 from the PON and temporarily substituting (indicated by dashed line) OTDR 10. The PON architecture shown in FIG. 1 is intended to be illustrative of a typical network. Note that each of the eight outputs of splitter 14 is coupled to the input of each of eight other 1:8 splitters 16. That is, splitters 16 are cascaded with splitter 14 to form a two-level cascaded arrangement or topology. The output of each of splitters 16 is coupled to an ONT 18. (The omission of some splitter outputs and ONTs 18 for purposes of clarity is indicated by an ellipsis (" . . . ") symbol.)

In use, light emitted by OTDR 10 travels through several spans of fiber as well as splitters 14 and 16 before reaching an ONT 18 and reflecting back through the same fiber and splitters 14 and 16 to OTDR 10. This arrangement does not work well because the fiber and splitters can contribute a total signal loss that can exceed the useful dynamic range of OTDR 10. For example, if the fiber contributes five decibels (dB) of loss, and each splitter contributes 10 dB, the total one-way loss is 25 dB, and the total two-way loss is 50 dB. It is generally not possible to take useful OTDR measurements where the signal loss is 50 dB. When OTDR measurements have been completed, OTDR 10 is disconnected from the PON and OLT 12 is re-connected.

Splitters having multiple inputs and multiple outputs are known in the art and have been used, for example, to couple a video overlay signal onto a PON in parallel with the OLT. In splitter nomenclature, a splitter having one input and eight outputs, for example, is commonly referred to as a "1:8" splitter, a splitter having two inputs and eight outputs, for example, is commonly referred to as a "2:8" splitter, etc.

It would be desirable to perform optical time-domain reflectometry in a PON in a manner that is not hampered by splitter and fiber losses. The present invention addresses these problems and deficiencies and others in the manner described below.

SUMMARY OF THE INVENTION

At least some of the splitters in a passive optical network have not only a first input coupleable to the optical line terminator (OLT) or output of another splitter but also a second input directly coupleable to an Optical Time-Domain Reflectometer (OTDR). Optical time-delay reflectometry can be performed upon a selected portion of the PON by selecting a splitter and transmitting an optical test signal from the OTDR directly to the input of the selected splitter and analyzing the reflected signal.

An optical problem or fault can be isolated to a specific sub-branch of the PON by iteratively repeating the method until a fault is isolated to a sub-branch of the PON. That is, if analysis of the reflected signal indicates that the fault exists on a branch having sub-branches, the method can be repeated on the sub-branch by transmitting the optical test signal from the OTDR directly to the second input of the splitter feeding the sub-branch.

DETAILED DESCRIPTION

Figure 1:
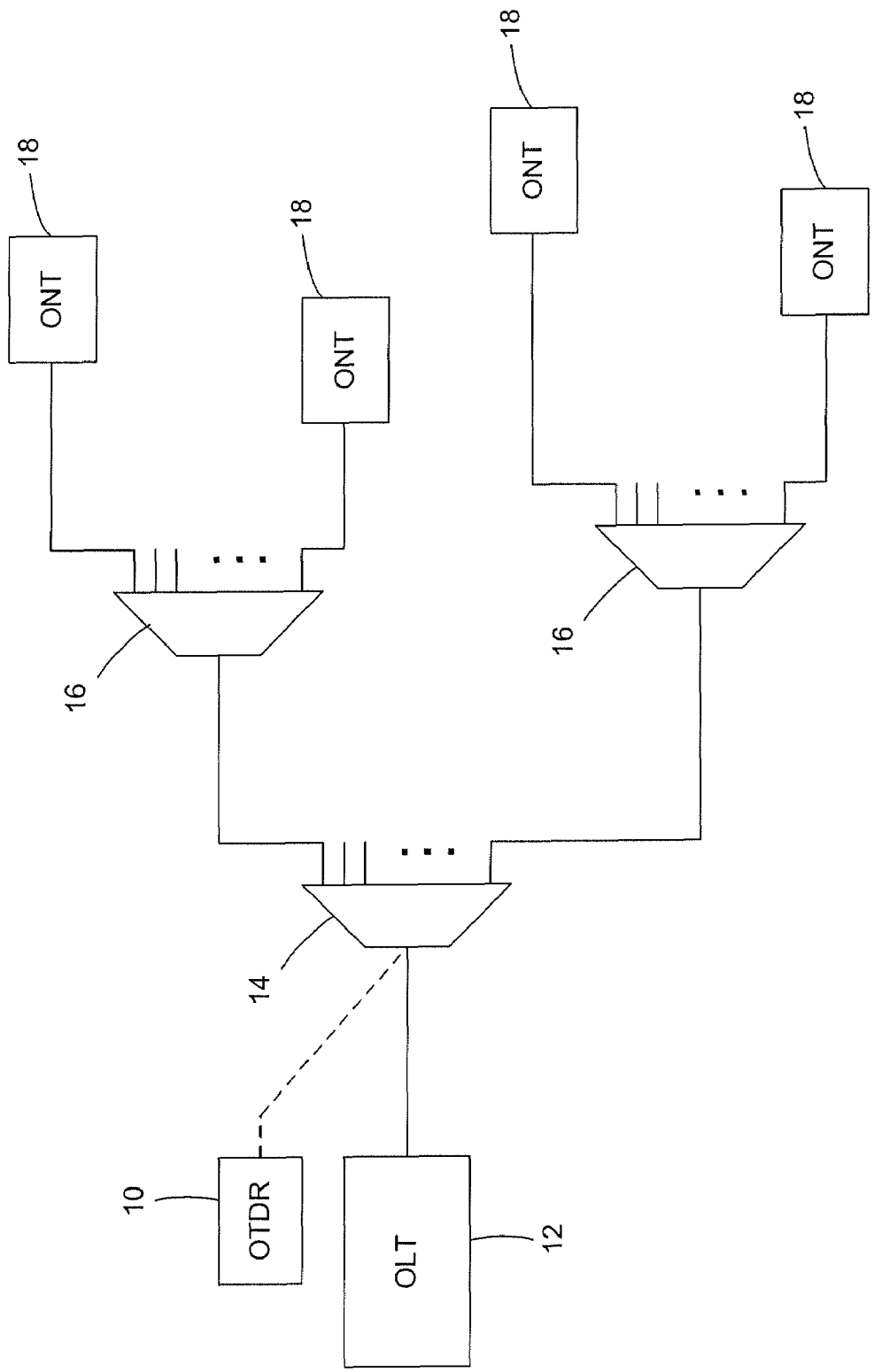
FIG. 1 is a network diagram of a conventional (prior art) arrangement for troubleshooting a passive optical network (PON) using an Optical Time-Domain Reflectometer (OTDR).
Figure 2:
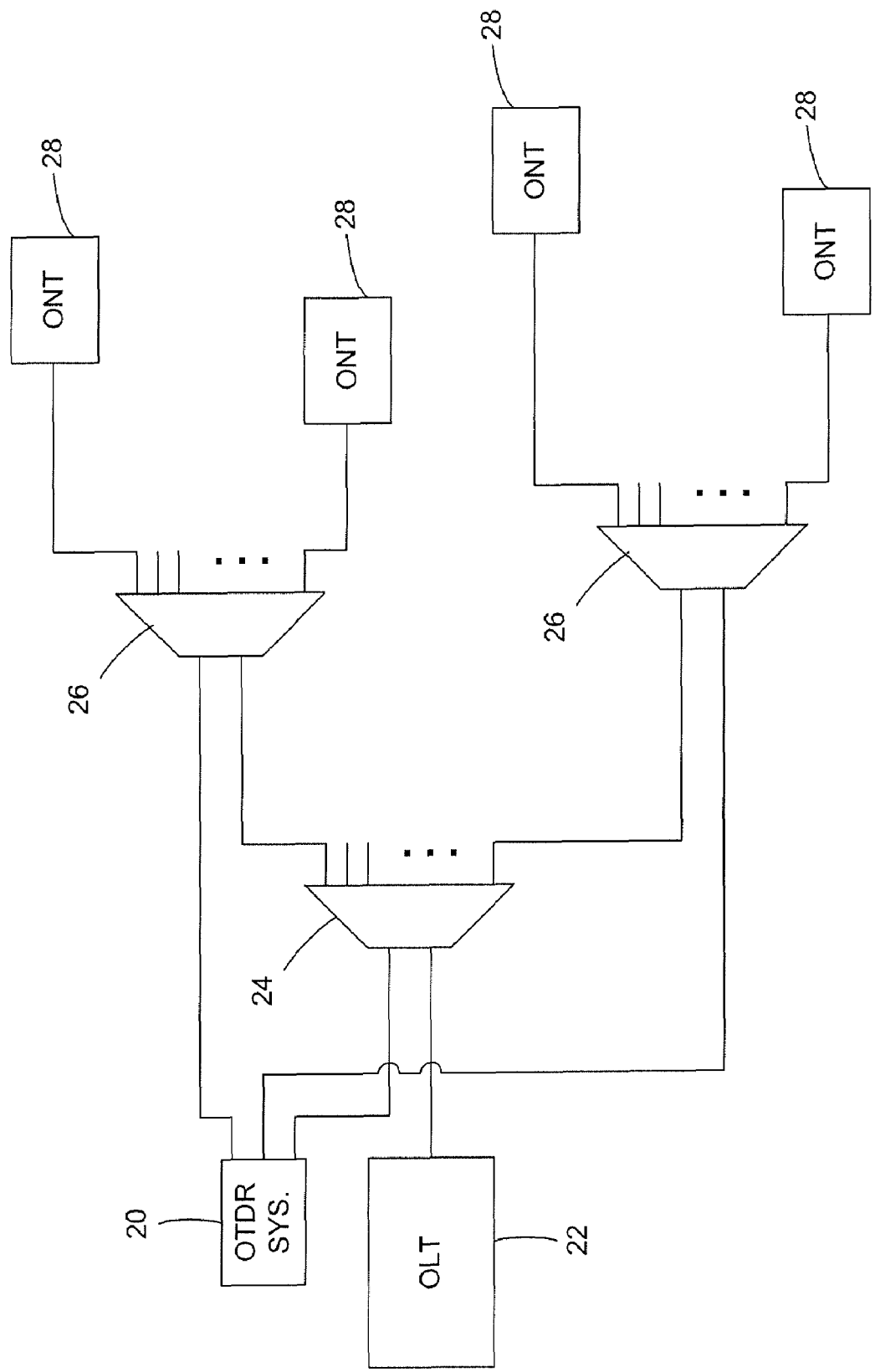
FIG. 2 is a network block diagram of an arrangement for troubleshooting a PON using an Optical Time-Domain Reflectometer (OTDR)-based system in accordance with an exemplary embodiment of the present invention.

As illustrated in FIG. 2, in an exemplary embodiment of the invention, an Optical Time-Domain Reflectometer (OTDR) system 20 has a plurality of connections to a passive optical network (PON). Although in the illustrated embodiment OTDR system 20 provides a plurality of connections that can be selectably operated (i.e., selected and operated independently of one another), in other embodiments a splitter or other suitable passive or active device (not shown) can be used to multiplex or switch a single OTDR output onto a plurality of fibers, including a manually operated device such as a switch or patch panel. The PON includes an optical line terminator (OLT) 22, a first-level (2:8) splitter 24, eight second-level (2:8) splitters 26, and 64 optical network terminals (ONTs) 28. Note that there is a cascade arrangement between first-level splitter 24 and each of second-level splitters 26. The number of ONTs 28 and splitters 24 and 26 and their arrangement in this embodiment is for purposes of illustration only, and other embodiments can have any other suitable number of ONTs and, accordingly, any suitable number, size (i.e., 2:N) and arrangement of splitters. Also, the term "splitter" is intended to encompass within its scope not only a unitary passive optical device that splits or distributes signals over two or more outputs but also any suitable system of two or more devices that performs an equivalent function.

More specifically, in the exemplary embodiment first-level splitter 24 has an input (which can be referred to as a PON input for convenience) coupled to OLT 22, another input (which can be referred to as an OTDR input for convenience) coupled to OTDR system 20, and a plurality of outputs, while each of second-level splitters 26 has a PON input coupled to an output of first-level splitter 24, an OTDR input coupled to OTDR system 20, and a plurality of outputs. Each ONT 28 is coupled to one of the outputs of one of splitters 26. As noted above, in other embodiments of the invention the splitters can be arranged in other suitable ways to service more or fewer ONTs, and in such an embodiment an ONT can be coupled to an output of a first-level splitter, second-level splitter, or any other level splitter. As no more than two levels are needed to illustrate the invention, an embodiment having only two levels is described for purposes of convenience.

Figure 3:
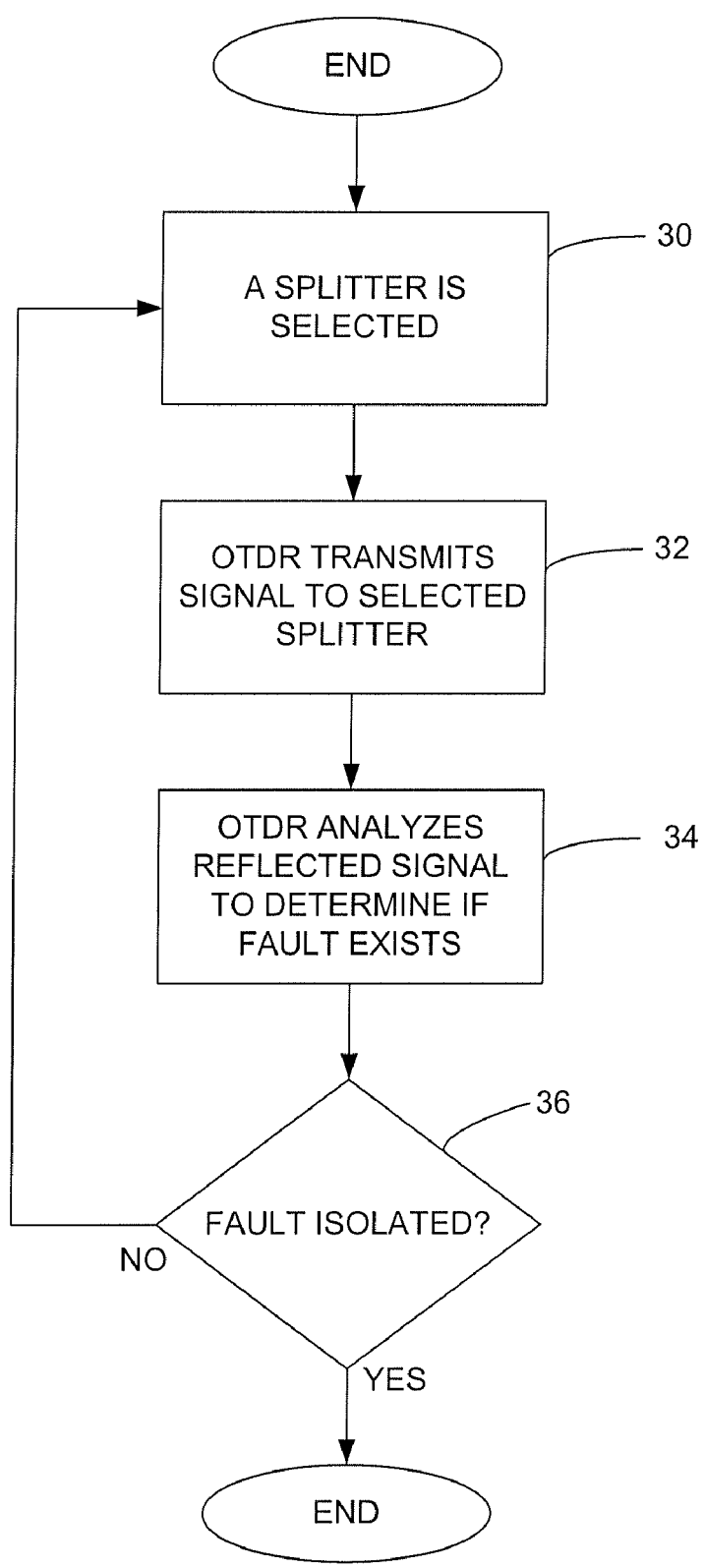
FIG. 3 is a flow diagram illustrating a method for troubleshooting a PON using the arrangement illustrated in FIG. 2.

As illustrated in FIG. 3, in accordance with an exemplary method of operation, in which optical time-domain reflectometry ("OTDR method") is used to troubleshoot a problem that the PON (FIG. 2) is believed to be experiencing, at step 30 one of splitters 24 or 26 is selected. Although in the exemplary embodiment of the invention OTDR system 20 can by used to select a single splitter 24 or 26, in other embodiments any other means can be used to couple an OTDR output to a selected splitter, such as a multiplexer or switching device (not shown). In some embodiments, a person can manually connect the OTDR output to a splitter input, e.g., through a patch panel, individual fiber plug-and-jack connectors or similar means, resulting in its selection.

At step 32, OTDR system 20 transmits an optical test signal to the input of the selected splitter 24 or 26 to which it is connected. Note that, as described above, an output of OTDR system 20 is directly connected (i.e., without any intervening splitters or other lossy elements) to an input of each splitter 24 and 26. As the other input is connected to either an output of splitter 24 or OLT 22, it is preferred that OTDR system 20 transmit a wavelength that does not interfere with the wavelengths on which OLT 22 operates. By operating OTDR system 20 and OLT 22 on non-interfering wavelengths, OTDR system 20 can be used to troubleshoot the network or portions thereof without interfering with normal network communication between OLT 22 and ONTs 28.

At step 34, OTDR system 20 is used to analyze the reflected optical signals in response to the transmitted optical test signal. The manner in which an OTDR is used to transmit a signal on an optical network and analyze the reflected signals to test whether a fault exists or otherwise evaluate the optical performance of the network is well-understood in the art and therefore not described herein. The term "fault" is used herein to refer to any optical abnormality, such as a broken or damaged fiber, faulty connector, splice loss, etc.

Note that the signal loss is minimized when a second-level splitter 26 is selected at the above-described step 30, thereby bypassing first-level splitter 24. For example, if the fiber contributes five decibels (dB) of loss, and each splitter 24 and 26 contributes 10 dB, by selecting a second-level splitter 26, the total one-way loss is only 15 dB, and the total two-way loss is only 30 dB. The OTDR method can be performed on the entire PON by performing it separately on each of its constituent portions. The signal loss experienced when any one of those portions is selected will not be so great as to exceed the dynamic range of OTDR system 20.

The method can be performed iteratively on different branches or portions of the PON to facilitate fault isolation, as indicated by step 36. For example, the method can first be performed by selecting a first one of splitters 26 at step 30. If the method indicates that there is no fault on the PON branch serviced by that splitter 26, the method can be performed again by selecting a second one of splitters 26 at step 30, and so on, until a fault is detected on one of the branches. In networks having more levels than the two shown in FIG. 2, once a fault is detected on one of the branches, the method can be continued by selecting splitters that service sub-branches. Of course, if a PON branch is known to be experiencing a problem (e.g., the network operator receives reports from subscribers experiencing problems in a residential neighborhood or office building or other localized area serviced by a portion of the PON), the method can begin with that branch.

Note that in the exemplary embodiment of the invention the OTDR method can be performed while the PON is in normal use because OTDR system 20 and OLT 22 operate at mutually non-interfering wavelengths and because each of splitters 24 and 26 has two inputs. Nevertheless, in other embodiments some or all of splitters 24 and 26 can have only one input, and a person can (e.g., manually) disconnect the splitter input from the PON and couple it to OTDR system 20 to perform the OTDR method, even if the OTDR and OLT operate at the same wavelength. For example, in an embodiment of the invention in which the selected splitter 24 were to have only a single input, a person could disconnect it from OLT 22, connect it to OTDR system 20, perform the OTDR method, disconnect it from OTDR system 20, and re-connect it to OLT 22.

It will be apparent to those skilled in the art that various modifications and variations can be made to this invention without departing from the spirit or scope of the invention. For example, although the specification above refers to various standards, such as GPON, the invention encompasses variations and alternatives that will occur readily to persons skilled in the art in view of the teachings herein. Thus, it is intended that the present invention cover the modifications and variations of this invention provided that they come within the scope of any claims and their equivalents. With regard to the claims, no claim is intended to invoke the sixth paragraph of 35 U.S.C. Section 112 unless it includes the term "means for" followed by a participle.

What is claimed is:

1. A system for performing optical time-delay reflectometry in a passive optical network (PON), comprising:
    an optical line terminator (OLT) coupled to a first level splitter; and
    an Optical Time-Domain Reflectometer (OTDR) selectably coupled to a first input of the first level splitter and one or more second level splitters, each of the second level splitters coupled to at least one optical network terminal (ONT),
    the OTDR transmitting an optical test signal directly to each of the selected and coupled second level splitters, and analyzing reflected optical signals in response to each of the transmitted optical test signals.

2. The system claimed in claim 1, wherein the optical test signal is transmitted using an optical wavelength that does not interfere with an optical wavelength on which the OLT operates.

3. The system claimed in claim 1, wherein the OTDR is selectably coupled to a second input of the first level splitter.

4. A method for performing optical time-delay reflectometry in a passive optical network (PON) comprising
    coupling an optical line terminator (OLT) to a first level splitter;
    selectably coupling an Optical Time Domain Reflectometer (OTDR) to a first input of the first level splitter and one or more second level splitters, each of the second level splitters coupled to at least one optical network terminal (ONT);
    transmitting an optical test signal from the OTDR directly to each of the selected and coupled second level splitters; and
    analyzing reflected optical signals at the OTDR in response to each of the transmitted optical test signals.

5. The method claimed in claim 4, wherein the selectably coupling step comprises selecting a second level splitter on a faulty branch of the PON.

6. The method claimed in claim 5, further comprising iteratively repeating the method until a fault is isolated to a sub-branch of the PON, wherein the selectably coupling step in further iterations comprises selectably coupling a splitter on a sub-branch of a faulty branch of the PON.

7. The method claimed in claim 5, wherein the transmitting step comprises transmitting the optical test signal using a wavelength that does not interfere with a wavelength on which the OLT operates.

8. The method claimed in claim 4, comprising selectably coupling the OTDR to a second input of the first level splitter.

9. A system for performing optical time-delay reflectometry in a passive optical network (PON) having a plurality of selectable, cascaded splitters, comprising:
    means for coupling an optical line terminator (OLT) to a first level splitter within the plurality of cascaded splitters;
    means for selectably coupling an Optical Time Domain Reflectometer (OTDR) to the first level splitter and one or more second level splitters within the plurality of cascaded splitters, each of the second level splitters coupled to at least one optical network terminal (ONT);
    means for transmitting an optical test signal from the OTDR directly to each of the selected and coupled second level splitters; and
    means for analyzing reflected optical signals at the OTDR in response to each of the transmitted optical test signals.

* * * * *